Aug. 4, 1942.　　　　　H. FRANK　　　　　2,291,705
PROCESS FOR CONNECTING PIPES
Filed Jan. 21, 1938　　　2 Sheets-Sheet 2

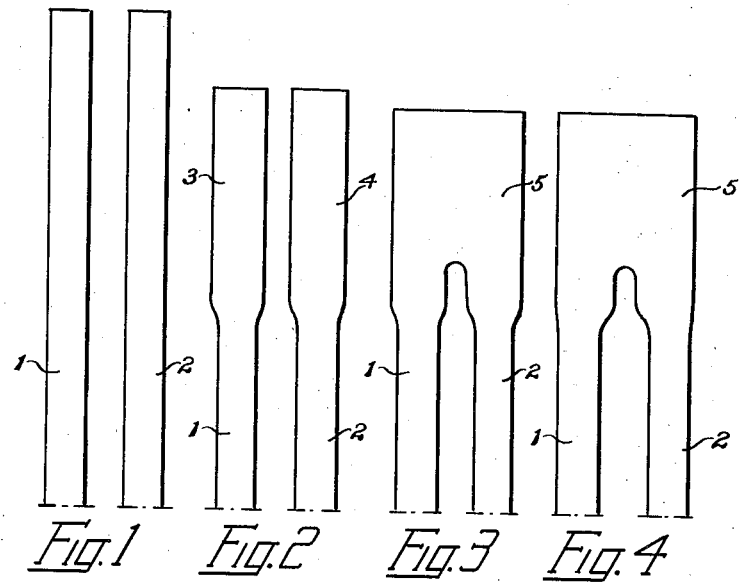
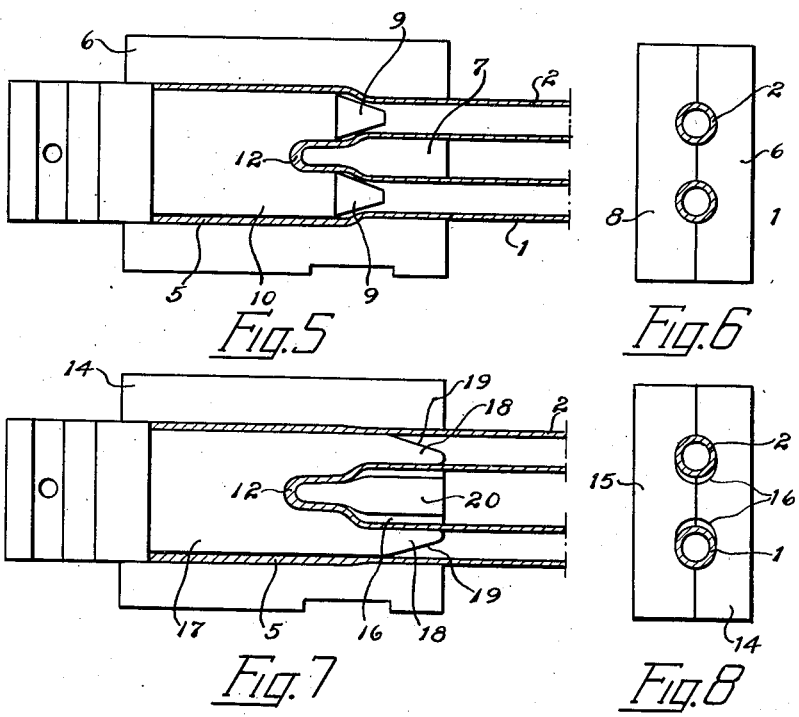

INVENTOR
HEBERT FRANK
BY O. P. Hill
ATTORNEY

Patented Aug. 4, 1942

2,291,705

UNITED STATES PATENT OFFICE 2,291,705

PROCESS FOR CONNECTING PIPES

Herbert Frank, Kassel-Wilhelmshohe, Germany, assignor to The Superheater Company, New York, N. Y.

Application January 21, 1938, Serial No. 186,070
In Germany January 22, 1937

3 Claims. (Cl. 29—157.6)

According to known processes for uniting the ends of two or more parallel tubes into a so-called "breeches piece" by welding by means of a die and plunger, the tubes are, after having been suitably heated, placed in parallel position into a die and are then slit open by the introduction of the plunger, the portions adjacent to the slits being bent outwardly and welded to each other. If it is desired to produce by this process a breeches piece in which the two pipes are spaced relatively far apart, difficulties will arise because the material available for forming the breeches piece becomes insufficient and unsatisfactory welds result even if a weld is possible at all. If tubes of greater wall thickness are employed, then there may usually be sufficient material for effecting the weld but the flat sides of the breeches piece, which are particularly endangered when such a structure is used with high pressures, may be too thin.

These difficulties are removed by the present invention. The invention contemplates that the tube ends which are to be connected to form the breeches piece are given a larger diameter and advantageously also greater wall thickness than the remaining portion of the tubes. The process according to the invention can be carried out by enlarging the diameter of the end portions of the tubes and then upsetting these portions. On the other hand, tubes may also be used which are from the outset, i. e. at the time they are drawn or rolled, provided with enlarged ends, these ends, if desired, having greater wall thickness than the remaining portions of the tubes.

In the drawings filed herewith, Figs. 1 to 4 show the form given to the tube ends by the several steps in the process as these ends are worked up in accordance with the present invention.

Fig. 5 shows the lower half of the die used in one step of the process together with the plunger at the end of its inward stroke and Fig. 6 shows a corresponding end view of the die with the pipes in place.

Figs. 7 and 8 show views corresponding to Figs. 5 and 6 respectively of equipment used in a subsequent step in the process.

Figure 9:
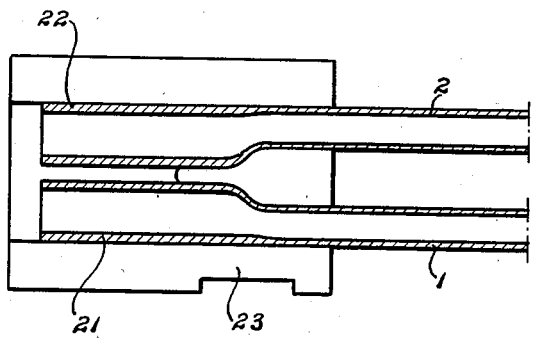
Fig. 9 shows the lower half of a die with the tube ends of a somewhat different shape as used in a varied form of the process and Fig. 10 shows the lower half of the die together with the tubes and the plunger at the end of its inward stroke.
Figure 10:
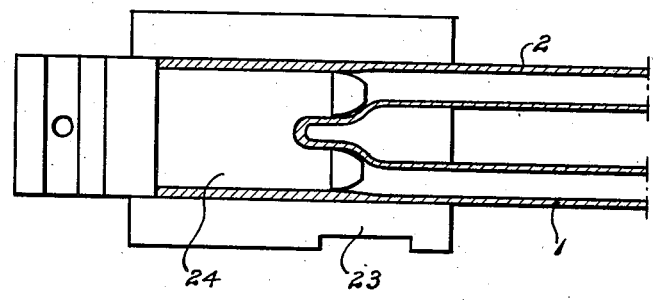

The straight tubes 1 and 2 of Fig. 1 are first provided with enlarged ends 3 and 4 as shown in Fig. 2. It is assumed that as these tubes are enlarged they are simultaneously upset so that these prepared ends have not only a larger diameter but also thicker walls. The axes of each tube and its enlarged ends are in alinement. Fig. 3 shows the two ends 3 and 4 united into a common breeches piece 5. The distance between the centers of the two tube lengths 1 and 2 is the same as that shown in Figs. 1 and 2. Fig. 4 shows the completed work, the two tube lengths having been offset or pushed outward in order to increase the distance between their centers so that the outer portions of the walls of the tubes lie about in alinement with the outside rounded portions of the walls of the breeches piece.

To carry out this process tubes formed as shown in Fig. 2 are placed into the die 6 (Fig. 5) which has two semi-cylindrical grooves to receive them. As a continuation of these grooves which are separated by the wall 7 there is provided a broad space in the die which corresponds to the form of the breeches piece to be formed. It will be understood that the other half of the die is symmetrical with that shown in Fig. 5 as will be clear from an inspection of Fig. 6. Fig. 5 shows the bifurcated plunger 10, with its two parallel pins 9, at the end of its stroke. The two pins 9 enter the two tube ends 3 and 4 as the plunger is introduced into the die, the two sides of the pipes facing each other being thereby slit, the portions adjacent to the slits being bent outwardly against the wall of the die. The edges of the bent-out portions come into forcible contact with each other and become welded to each other, and at the end of the separating wall 7 there is formed the crotch 12 of the breeches piece 5. Both the crotch and the remaining portions of the breeches piece 5 have a greater wall thickness than the tubes 1 and 2.

The pushing outward or off-setting of the tubes 1, 2 for the purpose of increasing the distance between them is performed in a subsequent step, the piece having, if necessary, been reheated for this purpose. The apparatus used in this subsequent step differs from that used in the preceding portions of the process by having the grooves 16 in the dies 14 and 15 not semi-cylindrical but oval in cross section and by the pins 18 of the plunger 17 having a greater distance between their centers. As the plunger 17 is forced into the die and the pins 18 enter the tube lengths 1 and 2, these tube lengths are forced outwardly by the sloping surfaces 19 of the pins away from the separating wall 20, which corresponds to wall 7 of Fig. 5.

In accordance with a varied form of the process of the invention, pieces are used for the welding step in the dies in which the tube lengths 1 and 2 are not coaxial with the enlarged ends 21, 22 but are laterally offset with respect to them. These pieces are, as shown in Fig. 9, placed into a correspondingly shaped die 23 in such a way that the tube lengths 1 and 2 have the distance between centers which is desired in the finished piece. The slitting, bending out and welding of the pipe ends into a breeches piece is then performed by means of the plunger 24. If pieces so shaped in which the enlarged ends are not coaxial with the tube lengths are used, the breeches piece can be fabricated in one step by means of a die and plunger.

It is possible even in the case where the enlarged ends are coaxial with the tube lengths to perform the process in a single step, apparatus in accordance with Figs. 7 and 8 being used. However, by using both steps, using the die and plunger of Figs. 5 and 6 as well as those shown in Figs. 7 and 8 a better piece is formed, the process being easier, and the material being compacted and the inner wall smoothed down.

What I claim is:

1. The method of integrally joining two pipe ends spaced apart at such a distance that the wall thickness of the pipes is insufficient to provide enough metal to form a joint of desired strength which comprises enlarging the pipe ends to give them a greater wall thickness than the remainder of the pipes; heating the pipe ends; holding the pipes closer to each other than the spacing they are to occupy in the finished piece; slitting the pipe ends along the walls facing each other; bending outward the portions adjacent the slits whereby the edges of such portions come into mutual contact and become welded to each other; and, after the connecting steps have been performed, laterally displacing the portions of the pipes adjacent the ends to increase the distance between them to correspond to the spacing desired in the finished piece.

2. The method of integrally joining two pipe ends spaced apart at such a distance that the wall thickness of the pipes is insufficient to provide enough metal to form a joint of desired strength which comprises enlarging the pipe ends to give them a greater wall thickness than the remainder of the pipes; heating the pipe ends; holding the pipes closer to each other than the spacing they are to occupy in the finished piece; slitting the pipe ends along the walls facing each other; bending outward the portions adjacent the slits whereby the edges of such portions come into mutual contact and become welded to each other; and, simultaneously with performance of the connecting steps, laterally displacing the portions of the pipes adjacent the ends to increase the distance between them to correspond to the spacing desired in the finished piece.

3. The method of integrally joining two pipe ends spaced apart at such a distance that the wall thickness of the pipes is insufficient to provide enough metal to form a joint of desired strength which comprises enlarging the pipe ends to give them a greater wall thickness than the remainder of the pipes; heating the pipe ends; holding the pipes closer to each other than the spacing they are to occupy in the finished piece; slitting the pipe ends along the walls facing each other; bending outward the portions adjacent the slits whereby the edges of such portions come into mutual contact and become welded to each other; and laterally displacing the portions of the pipes adjacent the ends to increase the distance between them to correspond to the spacing desired in the finished piece.

HERBERT FRANK.